United States Patent [19]

Lippert et al.

[11] Patent Number: 4,851,187

[45] Date of Patent: Jul. 25, 1989

[54] NUCLEAR REACTOR FUEL ASSEMBLY

[75] Inventors: Hans-Joachim Lippert, Hoechstadt/Aisch; Ahmet Ceylan, Nuremberg, both of Fed. Rep. of Germany

[73] Assignee: Siemens Aktiengesellschaft, Munich, Fed. Rep. of Germany

[21] Appl. No.: 157,034

[22] Filed: Feb. 16, 1988

[30] Foreign Application Priority Data

Feb. 18, 1987 [DE] Fed. Rep. of Germany ....... 3705181

[51] Int. Cl.$^4$ .............................................. G21C 3/30
[52] U.S. Cl. .................................... 376/448; 376/446
[58] Field of Search ................................ 376/446, 448

[56] References Cited

U.S. PATENT DOCUMENTS

| | | | |
|---|---|---|---|
| 3,321,195 | 5/1967 | Korte | 261/41 |
| 3,878,042 | 4/1975 | Curulla | 376/448 |
| 4,304,635 | 12/1981 | Lippert | 376/448 |
| 4,410,485 | 10/1983 | Lippert | 376/448 |
| 4,707,328 | 11/1987 | Arbink | 376/446 |

FOREIGN PATENT DOCUMENTS

| | | |
|---|---|---|
| 515371 | 11/1952 | Belgium . |
| 0142778 | 5/1985 | European Pat. Off. . |
| 2824265 | 12/1979 | Fed. Rep. of Germany . |
| 3027562 | 2/1982 | Fed. Rep. of Germany . |

Primary Examiner—Donald P. Walsh
Attorney, Agent, or Firm—Herbert L. Lerner; Laurence A. Greenberg

[57] ABSTRACT

A nuclear reactor fuel assembly includes a fuel assembly box. A head plate is disposed in the fuel assembly box. Fuel rods containing nuclear fuel are disposed in the fuel assembly box and guided in leadthroughs formed in the head plate, at least some of the fuel rods being secured in the head plate. A corner bolt stands on top of the head plate. A cross bar is disposed inside one of the corners at the upper end of the fuel assembly box on the corner bolt. An angle element is adapted to the fuel assembly box. Each of two leaf springs are disposed on an outer surface of the angle element at a respective one of the sides of the fuel assembly box and extend in longitudinal direction of the fuel assembly box. A screw bolt is firmly screwed to the fuel assembly box and the angle element at the corner bolt, the screw bolt has an expansion shaft with a reduced diameter, and a bolt head having two ends and being disposed on top of and supported on the angle element, the bolt head has an outer surface with an annular recess formed therein between the ends thereof defining a coaxial bolt head shaft with a reduced diameter, the bolt head shaft being disposed in a bore formed in the angle element between the ends of the bolt head. A transverse pin is disposed in the bore and has one end protruding into the annular recess.

5 Claims, 3 Drawing Sheets

NUCLEAR REACTOR FUEL ASSEMBLY

The invention relates to a nuclear reactor fuel assembly including a fuel assembly box having sides, an upper end and corners, a head plate disposed in the fuel assembly box, fuel rods containing nuclear fuel being disposed in the fuel assembly box and guided in leadthroughs formed in the head plate, at least some of the fuel rods being secured to the head plate in the leadthroughs, a corner bolt standing on top of the head plate, a cross bar disposed inside one of the corners at the upper end of the fuel assembly box on the corner bolt, an angle element having an outer surface and being adapted to the fuel assembly box, two leaf springs each being disposed on the outer surface of the angle element at a respective one of the sides of the fuel assembly box and extending in longitudinal direction of the fuel assembly box, a screw bolt firmly screwed to the fuel assembly box and the angle element at the corner bolt, the screw bolt having an expansion shaft with a reduced diameter, a bolt head having two ends and being disposed on top of and supported on the angle element, a constriction disposed between the ends of the bolt head defining a coaxial bolt head shaft with a reduced diameter, the constriction being disposed in a bore formed in the angle element between the ends of the bolt head, and a transverse pin being disposed in the bore and engaging the constriction.

A nuclear reactor fuel assembly of this type is known from European Patent Application No. 0 142 778, corresponding to U.S. application Ser. No. 120,725, filed Nov. 13, 1987. In this known fuel assembly, the transverse pin, which engages the constriction location between two ends of the bolt head, is secured at both ends on the angle element, and acts as a retainer in order to associate the screw bolt with the angle element in captive fashion. The screw bolt will break only at the expansion shaft and nowhere else whenever expansion forces in the screw bolt occurring in the loosening direction become too great, such as when the fuel assembly is used in a boiling water reactor. Meanwhile the constriction location of the bolt head, or in other words the bolt head shaft having a reduced diameter, is not stressed at all by these expansion forces. The transverse pin secured with both ends to the angle element thus prevents the fragments of the screw bolt from being able to become detached from the fuel assembly, when the expansion shaft breaks. Nevertheless, the screw bolt is rotatable about the longitudinal axis thereof. There is no provision, however, for replacement of the screw bolt, such as after the fuel assembly has been placed in the nuclear reactor. It is accordingly an object of the invention to provide a nuclear reactor fuel assembly, which overcomes the hereinafore-mentioned disadvantages of the heretofore-known devices of this general type and which permits easy replacement of the screw bolt.

With the foregoing and other objects in view there is provided, in accordance with the invention, a nuclear reactor fuel assembly, comprising a fuel assembly box having sides, an upper end and corners; a head plate disposed in the fuel assembly box; fuel rods containing nuclear fuel being disposed in the fuel assembly box and guided in leadthroughs formed in the head plate, at least some of the fuel rods being secured to the head plate in the leadthroughs; a corner bolt standing on top of the head plate; a cross bar disposed inside one of the corners at the upper end of the fuel assembly box on the corner bolt; an angle element having an outer surface and being adapted to the fuel assembly box; two leaf springs each being disposed on the outer surface of the angle element at a respective one of the sides of the fuel assembly box and extending in longitudinal direction of the fuel assembly box; a screw bolt firmly screwed to the fuel assembly box and the angle element at the corner bolt, the screw bolt having an expansion shaft with a reduced diameter, and a bolt head having two ends and being disposed on top of and supported on the angle element, the bolt head having an outer surface with an annular recess formed therein between the ends of the bolt head defining a coaxial bolt head shaft with a reduced diameter, the coaxial bolt head shaft being disposed in a bore formed in the angle element between the ends of the bolt head; and a transverse pin being disposed in the bore and having one end protruding into the annular recess in the bolt head.

The transverse pin protruding with one end into the annular recess or constriction location of the bolt head is removable from the angle element whenever the screw bolt is to be replaced.

In accordance with another feature of the invention, the transverse pin extends in radial direction of the bolt head shaft.

In accordance with a further feature of the invention, the transverse pin is a screw.

In accordance with an added feature of the invention, one of the leaf springs is firmly screwed to the angle element with the screw.

In accordance with a concomitant feature of the invention, the expansion shaft has a smaller diameter than the coaxial bolt head shaft.

Other features which are considered as characteristic for the invention are set forth in the appended claims.

Although the invention is illustrated and described herein as embodied in a nuclear reactor fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
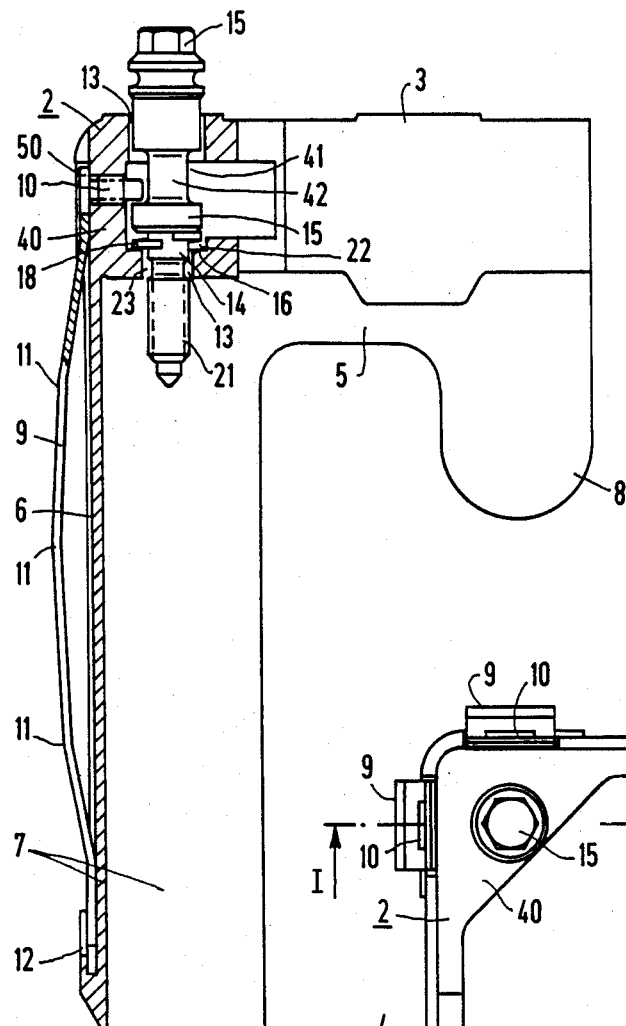
FIG. 1 is a diagrammatic, longitudinal-sectional view of an angle element for a nuclear reactor fuel assembly according to the invention, taken along the dot-dash line I—I in FIG. 3, in the direction of the arrows.
Figure 3:
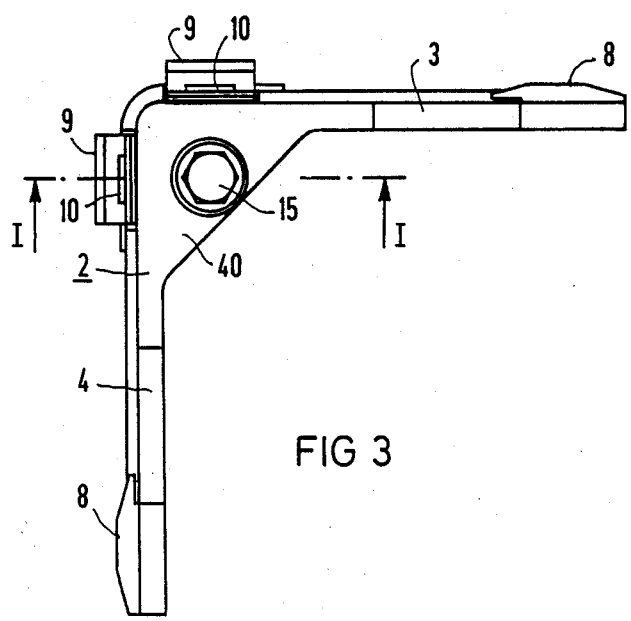
FIG. 3 is a top-plan view of the angle element of FIGS. 1 and 2.
Figure 2:
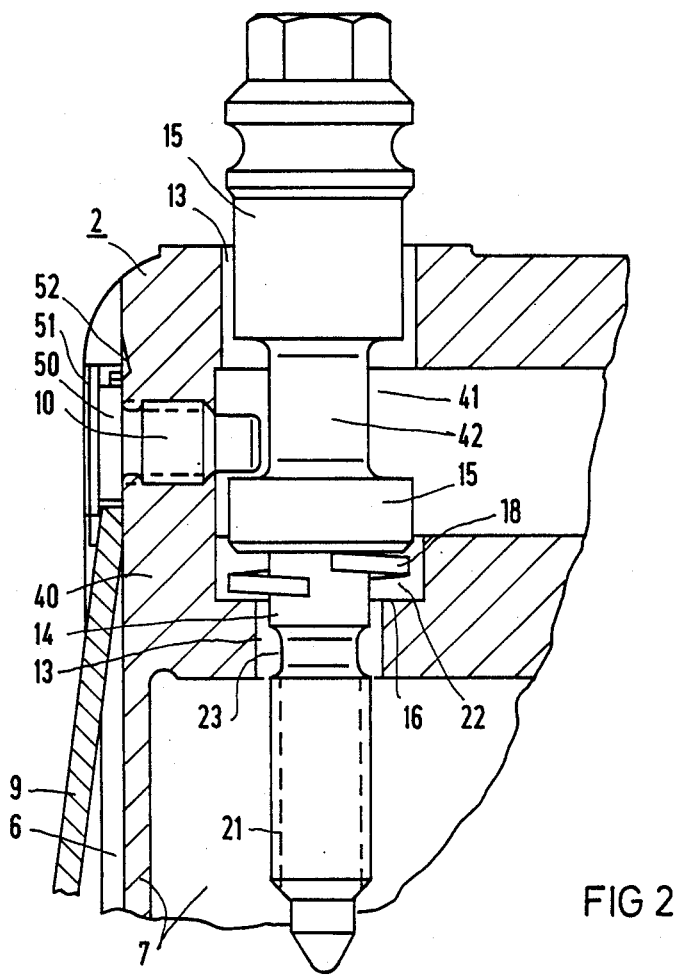
FIG. 2 is a fragmentary view of a portion of the angle element shown in FIG. 1 on an enlarged scale.

Referring now to the figures of the drawings in detail and first, particularly, to FIGS. 1-3 thereof, there is seen an angle element 2 having two legs 3 and 4 which are at right angles to one another and have equal lengths. Walls 5 and 6 are located on the same side of the legs 3 and 4. The walls 5 and 6 are at right angles to one another and to a top crosspiece 40 of the legs 3 and 4. In the top cross-piece 40, the walls 5 and 6 form an elongated L-shaped profile 7 which is at right angles to the legs 3 and 4, while at the ends of the legs 3 and 4 they are shaped into a rigid, outwardly protruding support knob 8.

On the outside of the L-shaped profile 7, an elongated leaf spring 9 is disposed on each of the two walls 5 and 6 in the direction of the L-shaped profile 7. One end of each leaf spring 9 is rigidly secured by a screw or transverse pin 10 to the angle element 2 at the upper end of the L-shaped profile 7. The other end of each leaf spring 9 is guided freely so as to slide in a slot 12 on the outside of the lower end of the L-shaped profile 7. The leaf springs 9 are bent at three transverse lines 11 in such a way that the leaf springs 9 curve outward away from the outside of the L-shaped profile 7.

The top crosspiece 40 of the legs 3 and 4 also has a through bore 13 formed therein at right angles to the two legs 3 and 4, that is parallel to the walls 5 and 6. A screw bolt 14 is displaceable and rotatable about the longitudinal axis thereof in the bore 13. The bore 13 has a smaller diameter on the underside of the angle element 2 than on the top and a shoulder 16 is thereby formed.

One end of the screw bolt 14 on the top of the angle element 2 has a bolt head 15, which has a larger diameter than the bore 13 at the shoulder 16. The bolt head 15 is associated with the shoulder 16 of the bore 13 for support on the angle element 2. A spring washer 18 yielding in the longitudinal direction of the screw bolt 14 is also loosely located on the screw bolt 14 between the bolt head 15 and the shoulder 16 in the bore 13 of the angle element 2, and a recess 22 is provided in the angle element 2 for the spring washer 18.

The other end of the screw bolt 14 at the underside of the angle element 2 is provided with a thread 21. An expansion shaft 23 of reduced diameter is located between the thread 21 and the bolt head 15. The thread 21 of the screw bolt 14 can be screwed on the top of a head plate of the nuclear reactor fuel assembly of FIG. 4 with a corner bolt. The bolt head 15 also has an annular recess or constriction location 41 in the outer surface thereof between the two ends thereof, which is formed by a coaxial bolt head shaft 42 of reduced diameter and is located in the bore 13 in the top of the angle element 2. In the angle element 2, the screws 10 with which the leaf springs 9 are firmly screwed to the angle element 2, are disposed radially relative to the bolt head shaft 42 in a common plane, which is perpendicular to the longitudinal axis of the screw bolt 14. One end of each of the two screws 10, which serve as transverse pins, protrudes or in other words extends freely between the two ends of the bolt head 15 into the annular recess or constriction location 41 in the bolt head, while the other end is secured to the angle element 2. The screws act as retaining structures for the screw bolt 14 at that location, in order to prevent the bolt head 15 from being able to slide out of the bore 13 in the direction of the longitudinal axis thereof toward the top of the angle element 2. This occurs due to the fact that the screws form a stop for the end of the bolt head 15 with the screw bolt 14 on the underside of the angle element 2. However, the bolt head shaft 42 is constructed in such a way as to be long enough to assure sufficient play for the bolt head 15 way spacing from the ends of the two screws 10. In this way, the spring washer 18 can be pressed into place in such a way that one end thereof rests flush on the shoulder 16 whenever the other end of the bolt head 15 has a diameter larger than the bolt head shaft 42.

The two screws 10 are hexagonal socket screws, for example, having screw heads 50 on the ends of the screws 10 located on the outside of the angle element 2. The ends of the screws also have crimped edges 51, which are bent into a depression 52 on the outside of the angle element 2 in order to secure the screw 10 against rotation in the depression 52.

Figure 4:
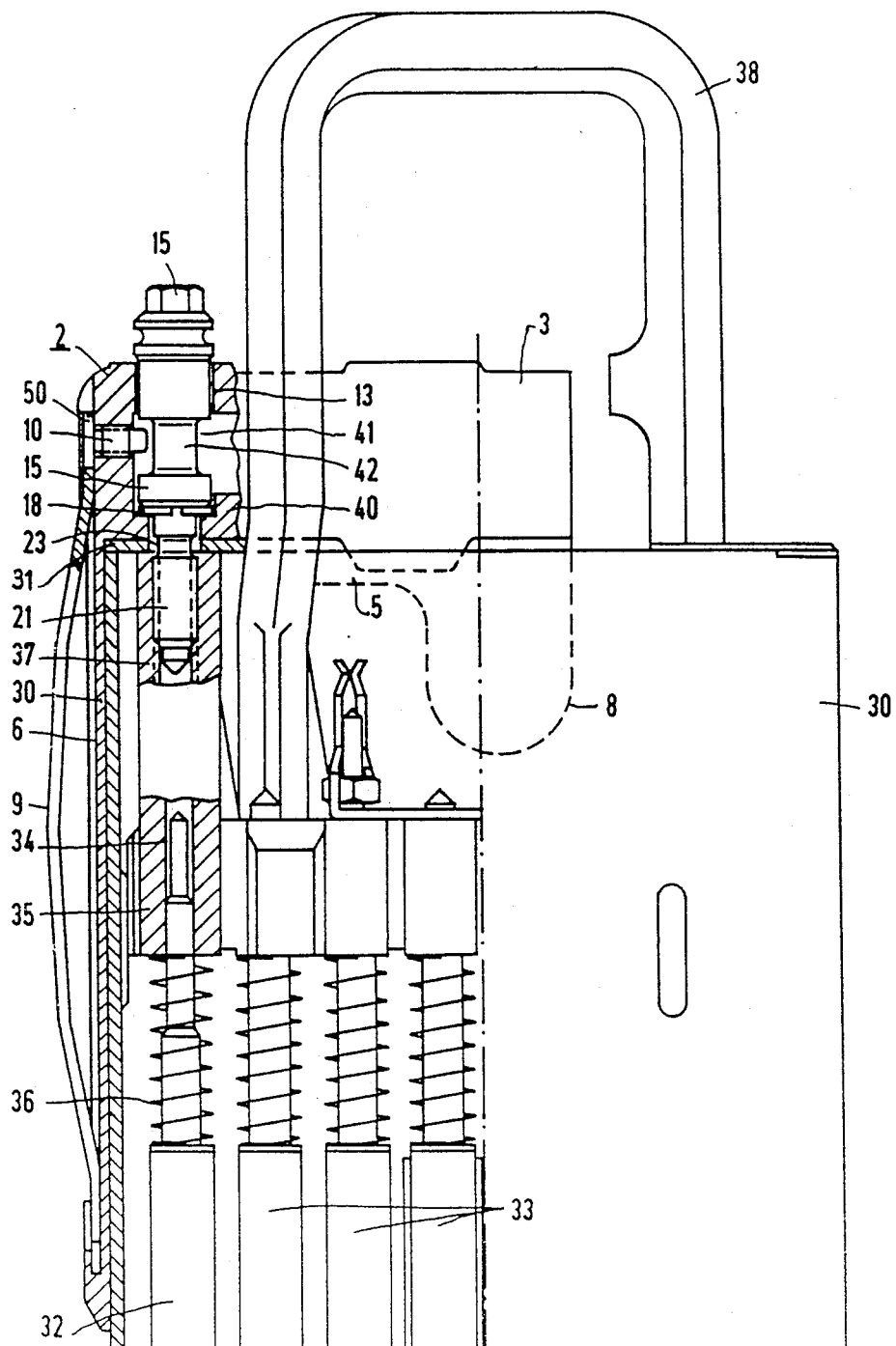
FIG. 4 is a partly longitudinal-sectional view showing the upper portion of a nuclear reactor fuel assembly with the angle element according to the invention.

As shown in FIG. 4, in which identical elements are provided with the same reference numerals as in FIGS. 1–3, the fuel assembly for a boiling water nuclear reactor has an elongated square fuel assembly box 30, which is provided with a crossbar 31 inside a corner at the upper end thereof. Fuel rods 32 and 33 filled with nuclear fuel are disposed beside one another inside the fuel assembly box 30, with longitudinal axes parallel to the longitudinal direction of the fuel assembly box 30. The upper ends of the fuel rods 32, which are adjacent the inside of the fuel assembly box 30, are guided through ducts or leadthroughs 34 in a head plate 35 inside the fuel assembly box 30 and screwed in the ducts 34. The upper ends of other fuel rods 33 filled with nuclear fuel are merely loosely guided in ducts in the head plate 35. All of the fuel rods 32 and 33 are supported against the head plate 35 by helical springs 36. In the same manner, the lower ends of the fuel rods 32 and 33 are guided in ducts in a bottom plate inside the fuel assembly box 30 which is not shown in FIG. 4 and the fuel rods 32 are once again screwed firmly in place.

A corner bolt 37 having a longitudinal axis parallel to the longitudinal direction of the fuel assembly box 30 and to the longitudinal axes of the fuel rods 32 and 33, is located on top of the head plate 35, in a corner of the fuel assembly box 30. The crossbar 31, which is located inside a corner of the fuel assembly box 30, rests on the upper end of the corner bolt 37. The top crosspiece 40 of the angle element 2 rests on the outside of the crossbar 31 in such a way that the fuel assembly box 30 is fitted in a play-free manner with the edge thereof between the walls 5 and 6 of the angle element 2 and in particular in the L-shaped profile 7.

The screw bolt 14 engages an opening or duct in the crossbar 31 and the threaded part 22 thereof is screwed firmly in a threaded bore in the corner bolt 37.

A hoop-like handle 38 for the gripper of a fuel assembly loading machine is also disposed on the top of the head plate 35.

In a boiling water nuclear reactor, as described in German Published, Non-Prosecuted Application DE-OS No. 28 24 265, corresponding to U.S. Pat. No. 4,304,635 and in German Published, Non-Prosecuted Application DE-OS No. 30 27 562, four fuel assemblies at a time are disposed as shown in FIG. 4 in a square grid opening of a transverse grid, which is the so-called upper core grid. Each of the fuel assemblies is thus located in one corner of the opening, in such way that the corners of the fuel assembly boxes 30 are located with the angle elements 2 in the center of the opening, where leaf springs 9 of laterally adjacent fuel assemblies are supported against one another, two at a time. The fuel assembly boxes of the four fuel assemblies located in the same opening of the core grid form a gap-like interstice with a + or cross-shaped cross section, in which an elongated control rod, which also has a + or cross-shaped cross section, is inserted from the lower ends of the four fuel assemblies.

When the four fuel assemblies are loaded into or unloaded from the openings of the core grid, expansion forces acting upon the screw bolt 14 in the longitudinal direction and exceeding a threshold value can at worst cause the screw bolt 14 to break at the expansion shaft 23 between the thread 21 and the bolt head 15 having a lesser diameter which is provided for this purpose, so that in this case there will be no loose part of the bolt to travel into the gap-like interstice between the fuel assembly boxes where it could hinder the control rod. This is because the thread 21 remains screwed into the corner bolt 37, while the rest of the screw bolt 14 including the spring washer 18 continues to be retained in captive fashion on the angle element 2, because of the screws 10 forming a stop for the bolt head 15 and because of the recess 22 for the spring washer 18.

If the screw bolt 14 on the radiation-exposed fuel assembly is to be replaced after use in the boiling water reactor, all that is required is to unscrew the screws 10, after bending the crimped edge or rim 51 open and out of the outside of the angle element 2, thus freeing the bolt head 15 and the screw bolt 14 as well.

We claim:

1. Nuclear reactor fuel assembly, comprising a fuel assembly box having sides, an upper end and corners; a head plate disposed in said fuel assembly box; fuel rods containing nuclear fuel being disposed in said fuel assembly box and guided in leadthroughs formed in said head plate, at least some of said fuel rods being secured to said head plate in said leadthroughs; a corner bolt standing on top of said head plate; a cross bar disposed inside one of said corners at said upper end of said fuel assembly box on said corner bolt; an angle element having an outer surface and being adapted to said fuel assembly box; two leaf springs each being disposed on said outer surface of said angle element at a respective one of said sides of said fuel assembly box and extending in longitudinal direction of said fuel assembly box; a screw bolt firmly screwed to said fuel assembly box and said angle element at said corner bolt, said screw bolt having an expansion shaft with a reduced diameter, and a bolt head having two ends and being disposed on top of and supported on said angle element, said bolt head having an outer surface with an annular recess formed therein between said ends of said bolt head defining a coaxial bolt head shaft with a reduced diameter, said coaxial bolt head shaft being disposed in a bore formed in said angle element between said ends of said bolt head; and a transverse pin being disposed in said bore and having one end protruding into said annular recess in said bolt head.

2. Fuel assembly according to claim 1, wherein said transverse pin extends in radial direction of said bolt head shaft.

3. Fuel assembly according to claim 1, wherein said transverse pin is a screw.

4. Fuel assembly according to claim 2, wherein one of said leaf springs is firmly screwed to said angle element with said screw.

5. Fuel assembly according to claim 1, wherein said expansion shaft has a smaller diameter than said coaxial bolt head shaft.

* * * * *